| United States Patent [19] | [11] Patent Number: 4,650,655 |
| Chu et al. | [45] Date of Patent: Mar. 17, 1987 |

[54] CRYSTALLIZATION OF ZSM-5 FROM REACTION MIXTURES CONTAINING ZEOLITE BETA

[75] Inventors: Pochen Chu, West Deptford; Rene B. LaPierre, Medford, both of N.J.

[73] Assignee: Mobil Oil Corporation, New York, N.Y.

[21] Appl. No.: 634,859

[22] Filed: Jul. 26, 1984

[51] Int. Cl.⁴ .............................................. C01B 33/28
[52] U.S. Cl. ..................................... 423/328; 423/329
[58] Field of Search ................................ 423/326–333; 502/77

[56] References Cited

U.S. PATENT DOCUMENTS

| 3,308,069 | 3/1967 | Wadlinger et al. | 423/328 |
| 4,275,047 | 6/1981 | Whittam | 423/329 |
| 4,503,024 | 3/1985 | Bourgogue et al. | 423/328 Z |

FOREIGN PATENT DOCUMENTS 0042226 12/1981 European Pat. Off. ............ 423/326

OTHER PUBLICATIONS

J. A. Martens et al, "Estimation of the Void Structure and Pore Dimensions of Molecular Sieve Zeolites Using the Hydroconversion of N-Decane", ZEOLITES, vol. 4, pp. 98 through 106, (1984).

*Primary Examiner*—John Doll
*Assistant Examiner*—Lance Johnson
*Attorney, Agent, or Firm*—A. J. McKillop; M. G. Gilman; M. V. Schneller

[57] ABSTRACT

ZSM-11, ZSM-50 and zeolite beta are effective seeds for the crystallization of ZSM-5.

3 Claims, No Drawings

CRYSTALLIZATION OF ZSM-5 FROM REACTION MIXTURES CONTAINING ZEOLITE BETA

BACKGROUND OF THE INVENTION

1. Field of the Invention

The present invention relates to the production of crystalline aluminosilicate ZSM-5, and more specifically, to improved methods for rapdily and efficiently producing ZMS-5 crystals from the zeolite forming solution.

2. Description of the Prior Art

The crystalline aluminosilicate zeolite known as ZSM-5 is particularly described in U.S. Pat. No. 3,702,886, the disclosure of which is incorporated herein by reference. ZSM-5 crystalline aluminosilicate is characterized by a silica-to-alumina mole ratio of greater than 5 and more precisely in the anhydrous state by the general formula:

$$[0.9 \pm 0.2 M_{2/n}O : Al_2O_3 :> 5 SiO_2]$$

wherein M is selected from the group consisting of a mixture of alkali metal cations and organo ammonium cations, particularly a mixture of sodium and tetraalkyl ammonium cations, the alkyl groups of which preferably contain 2 to 5 carbon atoms. The term "anhydrous" as used in the above context means that molecular water is not included in the formula. In general, the mole ratio of $SiO_2$ to $Al_2O_3$ for a ZSM-5 zeolite can vary rapidly. For example, ZSM-5 zeolites can be aluminum-free in which the ZSM-5 is formed from an alkali mixture of silica containing only impurities of aluminum. All zeolites characterized as ZSM-5, however, will have the characterisitic X-ray diffraction pattern set forth in U.S. Pat. No. 3,702,886 regardless of the aluminum content of the zeolite.

Seeding as a means for inducing crystallization is a very old technique. In the art of zeolite manufacture, various patents describe the use of seeding to induce the rapid crystallization of zeolites. Various patents describing the manufacture of zeolite crystals by seeding with a zeolite include: United Kingdom Pat. No. 1,297,256, in making ZSM-4; U.S. Pat. No. 3,247,194, in making ZK-5; U.S. Pat. No. 3,733,391, in making faujasite; and U.S. Pat. No. 4,007,253, in making faujasite in which the seed is not the same as the product. Patents disclosing the formation of zeolites by seeding with other aluminosilicates include: United Kingdom Pat. No. 1,117,568, in making ZSM-4; United Kingdom Pat. No. 1,160,463, in making faujasite; U.S. Pat. No. 3,578,398, in making a zeolite similar to offretite; and U.S. Pat. No. 3,947,482, in making various zeolites. It is to be understood that the mentioned preceding patents are not an exhaustive list of all patents which discuss forming zeolite crystals by seeding.

U.S. Pat. No. 4,275,047 discloses a method of making a zeolite of the ZSM-5 family by reacting an alkali mixture comprising an alumina source, a silica source and alkali metal ions in the presence of a seed quantity of a zeolite having a pore diameter in the range of 5.8 to 7.0 Angstrom units until the required zeolite has been formed and recovering the product zeolite. Zeolites that can be used as seeds include members of the ZSM-5 family including ZSM-5, ZSM-8, ZSM-11 and ZSM-12. Other zeolites include those having pore diameters in the above-stated range, in particular, zeolite nu-1 described in U.S. Pat. No. 4,060,590 and zeolite FU-1 described in U.S. Pat. No. 4,209,498. Other examples of zeolites useful as set forth in the patent include brewsterite, clinoptilolite, dachiardite, epistilbite, ferrierite, heulandite and stilbite, as well as ZSM-21, ZSM-35 and ZSM-38.

SUMMARY OF THE INVENTION

In accordance with the present invention, zeolites other than ZSM-5 were found to be effective seeds for accelerating the crystallization of the ZSM-5. Specifically, ZSM-11, ZSM-50, and zeolite beta were found to be effective seeds for the crystallization of ZSM-5. The fast crystallizaton is achieved by the elimination of the nucleation period. Unexpectedly, seeding in accordance with the present invention results in the formation of smaller size ZSM-5 crystals than those obtained when seeds are absent. The fact that sorption data indicate that ZSM-50 and zeolite Beta possess pore sizes significantly larger than those of ZSM-5 yet still accelerate crystallization of ZSM-5 is unexpected.

DESCRIPTION OF THE SPECIFIC EMBODIMENTS

ZSM-5 has the characteristic X-ray diffraction pattern set forth in Table 1 of U.S. Pat. No. 3,702,886, regardless of whether the ZSM-5 has been produced with a source of alumina, without the addition of an aluminum source, or wherein the aluminum is replaced in part or entirely by gallium, iron, boron, phosphorus, chromium or mixtures thereof.

Generally, ZSM-5 is prepared by preparing an aqueous soluton of tetraalkyl ammonium hydroxide, sodium oxide, an oxide of aluminum and an oxide of silica, and having a composition in terms of mole ratio of oxides, faling within the following ranges:

|  | Broad | Preferred | Particularly Preferred |
|---|---|---|---|
| $OH^-/SiO_2$ | 0.07–1.0 | 0.1–0.8 | 0.2–0.75 |
| $R_4N^+/(R_4N^+ + Na^+)$ | 0.2–0.95 | 0.3–0.9 | 0.4–0.9 |
| $H_2O/OH^-$ | 10–300 | 10–300 | 10–300 |
| $SiO_2/Al_2O_3$ | 5 | 5–300 | 15–300 | where R is propyl. Alternatively, there may be employed: an amine, suitably tri-n-propyl amine; quaternary alkyl ammonium salts such as, tetra-n-propyl ammonium bromide or a mixture of tri-n-propyl amine and n-propyl bromide, dissolved in a suitable solvent such as methylethyl ketone. Typical conditions maintained during crystallization include a temperature within the range of about 75° C. to 250° C. Preferably, the temperature is maintained in the range of about 90° C. to about 160° C.

The zeolites that can be used as seeds in accordance with the present invention include ZSM-11, ZSM-50, and zeolite beta. The preparation of ZSM-11 is more particularly defined in U.S. Pat. No. 3,709,979. The preparation of ZSM-50 is more particularly defined in U.S. pending application Ser. No. 386,456, filed June 8, 1982. The preparation of zeolite-beta is described in U.S. Pat. No. 3,308,069. All of the above patents are herein incorporated by reference.

The seed zeolite can be introduced in any convenient form, provided it does not include constituents, such as polyvalent ions, that are capable at the concentration used of interfering with the synthesis reaction. The seed may be the immediate solid product of synthesis or may be in a form from which alkali metal ions have been removed by ion exchange, or material from which organic compounds may be used in the synthesis have been removed by chemical treatment such as by oxidation, or the ammonium or hydrogen form can be used if desired. Re-exchange with cations will, or course, take place in the synthesis mixture, and so will rehydration if the seed is initially in dehydrated form.

If the ZSM-5 zeolite is desired in the form of an aluminosilicate, the aluminum source in the reaction mixture is most conveniently sodium aluminate, but can be aluminum salt, for example, the chloride or sulfate or alumina itself, which should be a hydrated or hydratable form such as colloidal, pseudobohmite, bohmite, gamma-alumina or the alpha or beta trihydrate. More than one source can be used if desired.

The silica source can be of any type having sufficient chemical reactivity to take part in the zeolite synthesis at adequate rate. Suitably it is a water-soluble or dissolved silicate such as a water glass or sodium metasilicate hydrate, sesquisilicate or disilicate, whether of the so-called "active" type or not. Alternatively, it can be a colloidal silica, for example, as sold under the trade name LUDOX, NALCOAG or SYTON which typically contain 20 to 50 percent w/w of silica in aqueous suspension.

The seed zeolite can be added to the ZSM-5 forming mixture at any stage before crystallization begins, but is preferably added during the induction period after which unwanted products may begin to crystallize.

As a result of the use of the seed zeolites of the present invention, the time and/or temperature of reaction can be usefully less than when using previously published methods of making zeolite ZSM-5. Thus, for example, whereas in making zeolite ZSM-5 by the methods described in the examples of U.S. Pat. No. 3,702,886, the reaction takes 5 to 8 days at 149° C. to 170° C., reaction times of 8 to 24 hours at 100° C. are typical for the method of the present invention.

After the zeolite synthesis reaction, the product can be subjected to any of the usual steps of washing, drying, calcination and ion exchange, such as are used in producing useful absorbents and/or catalysts. Suitable steps and uses are described in the specifications referred to above.

The following example illustrates the process of the present invention.

EXAMPLE 1

A reacting gel was prepared by mixing 288 g of LUDOX AS-40, 12 g of NaOH, 30 g of tetrapropyl ammonium bromide in 538 g of water. Seed crystals of various zeolites were added to the gel and blended into a homogenous slurry. The mixture was then heated to 212° F. Samples were periodically withdrawn, filtered, washed, dried, and submitted for crystallinity by determination by X-ray. The results were summarized in Table 1.

Referring to Table 1, it can be seen that not all zeolites of the same type are useful in the rapid crystallization of ZSM-5. For example, it can be seen that ZSM-23, while considered a zeolite of ZSM-5 type was not effective in enhancing the rapid crystallization of ZSM-5. Note further that a large pore sodium Y was not as effective in decreasing the time of crystallization as zeolite beta, another large pore zeolite.

TABLE 1

Crystallizations of ZSM-5 with Seeds

| Crystallizing Mixture | | | | | High SiO₂ ZSM-5 Formulation | | | | | |
|---|---|---|---|---|---|---|---|---|---|---|
| Seeds Type | ZSM-5 | ZSM-11 | ZSM-beta | ZSM-beta | ZSM-beta | ZSM-50 | ZSM-12 | ZSM-23 | NaY | — |
| % on Total SiO₂ | 5 | 5 | 5 | 10 | 50 | 5 | 5 | 5 | 5 | 0 |
| Crystallization Condition | | | | | Static in Plastic Jars | | | | | |
| Temperature, °F. | | | | | 212 | | | | | |
| Crystal. at | | | | | | | | | | |
| 1 Hr. | | | | | 55% B | | | | | |
| 3 Hr. | 20% | Some C | | | 55% B | | | | | |
| 6 Hr. | 75% C | | | | | | | | | |
| 8 Hr. | | 30% C | | 40% C | 60% B+C | A | | | | |
| 14 Hr. | | | | 100% C | | | | | | |
| 16 Hr. | | | 60% C | | | | | | | |
| 18 Hr. | | | | | | | Some C | | | A |
| 24 Hr. | 100% C | 100% C | | 115% C | 80% C+B | | A | A | A | A |
| 60 Hr. | | | 120% C | | | | | | | 45% C |
| 80 Hr. | | | | | | 105% C | 110% C | 115% C | 110% C | 110% C |
| | — | −9 | −4 | −6 | −8 | −7 | −3 | −1 | −2 | −5 |

A — Mainly amorphous, may contain trace of unidentified.
B — ZSM-beta
C — ZSM-5

EXAMPLE 2

The following description pertains to ZSM-50, and is excerpted from Ser. No. 386,456 referenced above. The porous crystalline zeolite ZSM-50 can be identified, in terms of moles of anhydrous oxides per 100 moles of silica, as follows:

$$(0-10)M_{2/n}O:(1-5)Al_2O_3:(100)SiO_2$$

wherein M is at least one cation having a valence n, and wherein the zeolite is characterized by a distinctive X-ray diffraction pattern substantially as shown in TABLE 1 hereinafter. The X-ray diffraction pattern of zeolite ZSM-50 has the following significant lines:

TABLE 1

| Interplanar d-Spacing (A) | Relative Intensity, I/Io |
|---|---|
| 20.1 ± .3 | W |
| 11.1 ± .17 | S |
| 10.1 ± .16 | M |
| 9.7 ± .14 | W |
| 5.77 ± .09 | W |
| 5.61 ± .09 | W |
| 4.64 ± .07 | M |

TABLE 1-continued

| Interplanar d-Spacing (A) | Relative Intensity, I/Io |
|---|---|
| 4.35 ± .07 | M |
| 4.30 ± .07 | VS |
| 4.00 ± .06 | S |
| 3.85 ± .06 | M |
| 3.70 ± .06 | M |
| 3.42 ± .05 | W |
| 3.35 ± .05 | W |
| 3.27 ± .05 | M |
| 3.24 ± .05 | W |
| 2.94 ± .04 | W |
| 2.53 ± .04 | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.) the interplanar spacing in Angstrom Units (A), corresponding to the recorded lines, were determined. In Table 1, the relative intensities are given in terms of the symbols W=weak, M=medium, S=strong and VS=very strong. In terms of intensities, these may be generally designated as follows:

W=0–20

M=20–40

S=40–60

VS=60–100

It should be understood that this X-ray diffraction pattern is characteristic of all the species of zeolite ZSM-50 compositions. The sodium form as well as other cationic forms reveal substantially the same pattern with some minor shifts in interplanar spacing and variation in relative intensity. Other minor variations can occur, depending on the silicon to aluminum ratio of the particular sample, as well as its degree of thermal treatment.

Two separate synthesis reaction mixtures were prepared with compositions indicated in TABLE 2. The mixtures were prepared with silica sol (30 percent $SiO_2$), KOH, $Al_2(SO_4)_3 \cdot 16H_2O$, Diquat-6 iodide and water. The mixtures were maintained at 160° C. for 3 days in a stainless steel, stirred (400 rpm) autoclave when crystallization was complete. The solids were separated from any unreacted components by filtration and then water washed followed by drying at 110° C. The product crystals were analyzed by X-ray diffraction and found to be 100 percent zeolite ZSM-50. Other properties of the product zeolite were measured and are presented in TABLE 3. The X-ray diffraction pattern of the zeolite ZSM-50 product of Example 2 is set forth in TABLE 4. The product ZSM-50 of Example 1 was tested for acid activity by the Alpha Test and for Constraint Index and found to have an Alpha Value of 90 and a Constraint Index of 1.2.

TABLE 2

| | Mixture Composition (Mole Ratios) | | | | |
|---|---|---|---|---|---|
| Example | R*/$SiO_2$ | $SiO_2/Al_2O_3$ | $H_2O/SiO_2$ | $OH^-/SiO_2$ | $K^+/SiO_2$ |
| 1 | 60 | 40 | 0.2 | 0.29 | 0.15 |
| 2 | 60 | 40 | 0.2 | 0.29 | 0.19 |

*R = Diquat-6 = $[I(CH_3)_3N(CH_2)_6N(CH_3)_3I]$.

TABLE 3

| | | Sorptions, 25° C. | | | |
|---|---|---|---|---|---|
| Example | $SiO_2/Al_2O_3$ | n-hexane | 3-methyl-pentane | Cyclo-hexane | $H_2O$ |
| 1 | 36 | 7.6 | — | 2.2 | 6.6 |
| 2 | — | 8.1 | 8.1 | 2.1 | 7.8 |

TABLE 4

X-Ray Diffraction Data for ZSM-50 of Example 2

| Observed 2 theta | d(A) | Rel. Int. |
|---|---|---|
| 4.40 | 20.08 | 4.0 |
| 7.93 | 11.15 | 40.0 |
| 8.77 | 10.08 | 24.0 |
| 9.10 | 9.72 | 8.0 |
| 11.64 | 7.60 | 1.0 |
| 11.90 | 7.44 | 0.5 |
| 12.90 | 6.86 | 4.0 |
| 14.15 | 6.26 | 0.5 |
| 14.33 | 6.18 | 0.5 |
| 15.35 | 5.77 | 5.0 |
| 15.63 | 5.67 | 2.0 |
| 15.80 | 5.61 | 2.0 |
| 15.90 | 5.57 | 1.5 |
| 16.00 | 5.54 | 1.0 |
| 16.25 | 5.45 | 1.0 |
| 16.55 | 5.36 | 1.0 |
| 17.25 | 5.14 | 0.5 |
| 18.19 | 4.88 | 1.0 |
| 18.41 | 4.82 | 1.0 |
| 18.60 | 4.77 | 1.5 |
| 19.12 | 4.64 | 35.0 |
| 20.40 | 4.35 | 28.0 |
| 20.65 | 4.30 | 100.0 |
| 22.22 | 4.00 | 58.0 |
| 23.07 | 3.85 | 33.0 |
| 24.04 | 3.70 | 23.0 |
| 24.55 | 3.62 | 2.0 |
| 25.12 | 3.54 | 0.5 |
| 26.05 | 3.42 | 17.0 |
| 26.60 | 3.35 | 17.0 |
| 27.30 | 3.27 | 33.0 |
| 27.48 | 3.24 | 15.0 |
| 28.35 | 3.15 | 3.0 |
| 28.95 | 3.08 | 2.0 |
| 29.20 | 3.06 | 1.5 |
| 29.80 | 3.00 | 0.5 |
| 30.40 | 2.94 | 5.0 |
| 30.80 | 2.90 | 1.0 |
| 31.00 | 2.88 | 0.5 |
| 33.21 | 2.70 | 4.0 |
| 33.95 | 2.64 | 1.0 |
| 34.25 | 2.62 | 1.0 |
| 34.75 | 2.58 | 1.0 |
| 35.00 | 2.56 | 1.0 |
| 35.42 | 2.53 | 8.0 |
| 36.35 | 2.47 | 2.0 |
| 37.43 | 2.40 | 4.0 |
| 37.95 | 2.37 | 0.5 |
| 38.85 | 2.32 | 3.0 |
| 39.30 | 2.29 | 3.0 |
| 41.78 | 2.16 | 2.0 |
| 42.80 | 2.11 | 4.0 |
| 45.00 | 2.01 | 1.0 |
| 45.50 | 1.99 | 3.0 |
| 46.70 | 1.94 | 2.0 |
| 47.50 | 1.91 | 3.0 |
| 48.60 | 1.87 | 2.0 |
| 49.57 | 1.84 | 2.0 |

TABLE 4-continued

X-Ray Diffraction Data for ZSM-50 of Example 2

| Observed 2 theta | d(A) | Rel. Int. |
| --- | --- | --- |
| 50.05 | 1.82 | 1.0 |
| 51.20 | 1.78 | 2.0 |
| 51.50 | 1.77 | 1.0 |
| 53.00 | 1.73 | 1.0 |
| 54.00 | 1.70 | 1.0 |
| 56.20 | 1.64 | 3.0 |
| 56.70 | 1.62 | 1.0 |
| 59.60 | 1.55 | 0.5 |

What is claimed is:

1. A process for making ZSM-5 comprising providing a reaction mixture from which ZSM-5 can crystallize, which reaction mixture is an alkaline mixture including a silica source with or without alumina; contacting said reaction mixture with a seed quantity of zeolite beta, and allowing ZSM-5 to crystallize.

2. The process of claim 1, wherein said reaction mixture further includes a tetraalkyl ammonium compound.

3. The process of claim 1, wherein said reaction mixture further includes a tetrapropyl ammonium compound.

* * * * *